(12) United States Patent
Kim et al.

(10) Patent No.: US 12,311,347 B2
(45) Date of Patent: May 27, 2025

(54) SYSTEM TO CONVERT COKE IN FLUID CATALYTIC CRACKING PROCESS BY UTILIZING METAL OXIDES WITH IN-SITU $CO_2$ CAPTURE

(71) Applicant: ExxonMobil Technology and Engineering Company, Annandale, NJ (US)

(72) Inventors: Hyung Rae Kim, Basking Ridge, NJ (US); Arun K. Sharma, Hellertown, PA (US); Bing Du, Pittstown, NJ (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 1076 days.

(21) Appl. No.: 17/207,946

(22) Filed: Mar. 22, 2021

(65) Prior Publication Data

US 2022/0297108 A1      Sep. 22, 2022

(51) Int. Cl.
*B01J 38/30*      (2006.01)
*C01B 3/06*       (2006.01)

(52) U.S. Cl.
CPC .............. *B01J 38/30* (2013.01); *C01B 3/061* (2013.01); *C01B 2203/86* (2013.01)

(58) Field of Classification Search
CPC ....... B01J 38/30; C01B 3/061; C01B 2203/86
See application file for complete search history.

(56) References Cited

U.S. PATENT DOCUMENTS

| 4,343,624 A | 8/1982 | Belke et al. |
| 7,767,191 B2 | 8/2010 | Thomas et al. |

OTHER PUBLICATIONS

Tong et al., "Iron-based syngas chemical looping process and coal-direct chemical looping process development at Ohio State University", Applied Energy 113 (2014) 1836-1845.
Li et al., "Biomass direct chemical looping process: Process simulation", Fuel 89 (2010) 3773-3784.
Kim et al., "Coal direct chemical looping combustion process: design and operation of a 25-kWth sub-pilot unit", Fuel 108 (2013) 370-384.
Wang et al., "Chemical looping combustion of a Chinese anthracite with Fe2O3-based and CuO-based oxygen carriers", Fuel Processing Technology 96 (2012) 104-115.
Leion et al., "Solid fuels in chemical-looping combustion", International Journal of Greenhouse Gas Control 2 (2008) 180-193.
(Continued)

*Primary Examiner* — Smita S Patel
(74) *Attorney, Agent, or Firm* — Vorys, Sater, Seymour and Pease, LLP

(57) ABSTRACT

This disclosure relates to methods for reducing $CO_2$ emissions from a fluid catalytic cracking process by providing a chemical looping system comprising a regenerator and reducer reactor, an oxidizer reactor, and a combustor reactor, and by sequestering the carbon dioxide of a $CO_2$ and $H_2O$ stream. Also, this disclosure relates to methods for reducing $CO_2$ emissions from a fluid catalytic cracking process by partially oxidizing catalyst coke particles in a fluid catalytic cracking regenerator reactor to produce synthesis gas, and by providing a chemical looping system comprising a reducer reactor, an oxidizer reactor, and a combustor reactor.

17 Claims, 5 Drawing Sheets

(56) References Cited

OTHER PUBLICATIONS

Dennis et al., "In situ gasification of coal and CO2 separation using chemical looping with a Cu-based oxygen carrier", Fuel 89 (2010) 1623-1640.
Cao et al., "Investigation of chemical looping combustion by solid fuels. 1. Process analysis", Energy & Fuels 20 (2006) 1836-1844.
Siriwardane et al., "Evaluation of reaction mechanism of coal-metal oxide interactions in chemical-looping combustion" Combustion and Flame 157 (2010) 2198-2208.

SYSTEM TO CONVERT COKE IN FLUID CATALYTIC CRACKING PROCESS BY UTILIZING METAL OXIDES WITH IN-SITU $CO_2$ CAPTURE

FIELD

This application relates to processes and systems for reducing $CO_2$ emissions from catalyst coke generated by the fluid catalytic cracking process.

BACKGROUND

The fluid catalytic cracking (FCC) process is a common process used in petroleum refineries to convert high molecular weight hydrocarbons from crude oil to lower molecular weight hydrocarbons for use in gasoline, olefins and other hydrocarbon products. This conversion to lower molecular weight hydrocarbons is called cracking. The fluid catalytic cracking unit usually comprises a FCC reactor and a FCC regenerator. The feedstock for the FCC process is the portion of the crude oil with a boiling point greater than 340° C. (644° F.). This portion of the crude oil is preheated to a temperature of about 315 to 430° C., fed into the FCC reactor and then brought into contact with a catalyst to break down or "crack" the high molecular weight hydrocarbons. The FCC catalyst is a microspheroidal catalyst, which behaves like a liquid when aerated by gas. Typically, FCC catalysts are in the form of fine powders with an average particle size of 60-75 μm and a size distribution from 20 to 120 μm. When this catalytic cracking occurs, carbon-containing compounds (also known as catalyst coke) deposit in the pores of the FCC catalyst. The presence of catalyst coke reduces the activity of the FCC catalyst.

After the catalytic cracking occurs, the catalyst particles are separated from the cracked vapors. The spent catalyst particles are fed into a FCC regenerator. Typically, the spent catalyst particles contain between 0.4 to 2.5 wt % catalyst coke. The coke is composed of carbon, hydrogen and trace amounts of sulfur and nitrogen. In the FCC regenerator, a stream of air reacts with the catalyst coke particles to regenerate the catalyst. This combustion process in the FCC regenerator produces a large amount of $CO_2$ emissions in a petroleum refinery.

One method for capturing $CO_2$ emissions and thereby decreasing $CO_2$ emissions to the environment is the chemical looping process. The chemical looping process utilizes oxygen carrier particles to convert carbon-based fuels to electricity, hydrogen and sequestrable $CO_2$. The oxygen carrier particles in the carbon looping process are metal oxides capable of undergoing a reduction reaction with the fuel stream and an oxidation reaction with an oxygen carrying stream. The reduction of the metal oxide particles with a carbon-based fuel generates streams of carbon monoxide, hydrogen, carbon dioxide, water vapor and reduced metal oxide particles. The reduced metal oxide particles are then oxidized with air to produce heat and/or oxidized with steam to produce hydrogen. These two reduction and oxidation reactions together is called the chemical looping process.

One example of the chemical looping process is disclosed in U.S. Pat. No. 4,343,624. U.S. Pat. No. 4,343,624 discloses a hydrogen production process where ferric oxide reacts with CO and $H_2$ to form iron, carbon dioxide and steam according to the following reaction: $Fe_3O_4 + 2H_2 + 2CO \rightarrow 3Fe + 2CO_2 + 2H_2O$. The resulting iron and steam are then oxidized to form hydrogen according to the following oxidation reaction: $3Fe + 4H_2O \rightarrow Fe_3O_4 + 4H_2$.

Another example of the chemical looping process is disclosed in U.S. Pat. No. 7,767,191. U.S. Pat. No. 7,767,191 discloses a method for producing a hydrogen gas stream and a separate sequestrable $CO_2$ stream comprising reacting an $Fe_2O_3$ containing particle with a carbonaceous fuel. The reduction process comprises reducing an $Fe_2O_3$ containing with a carbonaceous fuel in a reactor to produce a stream of metallic iron containing particles and a stream of $CO_2/H_2O$ gas. The oxidation process comprises two steps. The first step is the oxidation of metallic iron containing particles with steam in a second reactor to produce a stream of iron oxide containing particles and a stream of hydrogen. The second step is the oxidation of the iron oxide containing particles with an oxygen containing gas to produce $Fe_2O_3$ containing particles. In both U.S. Pat. Nos. 4,343,624 and 7,767,191, a $CO_2$ stream is produced that can be sequestered and captured.

There is a need to efficiently reduce the $CO_2$ emissions from the fluid catalytic cracking process.

SUMMARY

Disclosed is a method for reducing $CO_2$ emissions from a fluid catalytic cracking process by
 (a) providing a chemical looping system comprising a reducer/regenerator reactor, an oxidizer reactor and a combustor reactor;
  (i) feeding catalyst coke particles and metal oxide particles into the reducer/regenerator reactor of the chemical looping system to produce a plurality of streams comprising a regenerated catalyst stream, a $CO_2/H_2O$ stream and a reduced metal oxide particle stream;
  (ii) feeding the stream of reduced metal oxide particles and a stream of water vapor into the oxidizer reactor of the chemical looping system to produce a plurality of streams comprising a hydrogen stream and a stream of oxidized metal oxide particles; and
  (iii) feeding the stream of oxidized metal oxide particles and a stream of air into the combustor reactor of the chemical looping system to produce heat and a stream of metal oxide particles; and
 (b) sequestering the carbon dioxide of the $CO_2/H_2O$ stream of step (a)(i) to reduce the $CO_2$ emissions from the reducer/regenerator reactor.

Further disclosed is a method for reducing $CO_2$ emissions from a fluid catalytic cracking process by
 (a) partially oxidizing catalyst coke particles in a fluid catalytic cracking regenerator reactor to produce synthesis gas;
 (b) providing a chemical looping system comprising a reducer reactor, an oxidizer reactor and a combustor reactor;
  (i) feeding the synthesis gas and metal oxide particles into the reducer reactor of the chemical looping system to produce a plurality of streams comprising a $CO_2/H_2O$ stream and a reduced metal oxide particle stream;
  (ii) feeding the stream of reduced metal oxide particles and a stream of water vapor into the oxidizer reactor of the chemical looping system to produce a plurality of streams comprising a hydrogen stream and an oxidized metal oxide particle stream; and
  (iii) feeding the stream of oxidized metal oxide particles and a stream of air into the combustor reactor of the chemical looping system to produce heat and a stream of metal oxide particles; and (c) sequestering the carbon dioxide of the $CO_2/H_2O$ stream of step (b)(i) to reduce the $CO_2$ emissions from the reducer reactor.

BRIEF DESCRIPTION OF THE FIGURES

For a better understanding of the nature, objects, and processes involved in this disclosure, reference should be made to the detailed description taken in conjunction with the accompanying figures. The subject matter disclosed is capable of considerable modifications, alterations, combinations, and equivalents in form and function, as will occur to those skilled in the art and having the benefit of this disclosure.

DETAILED DESCRIPTION

Figure 1:
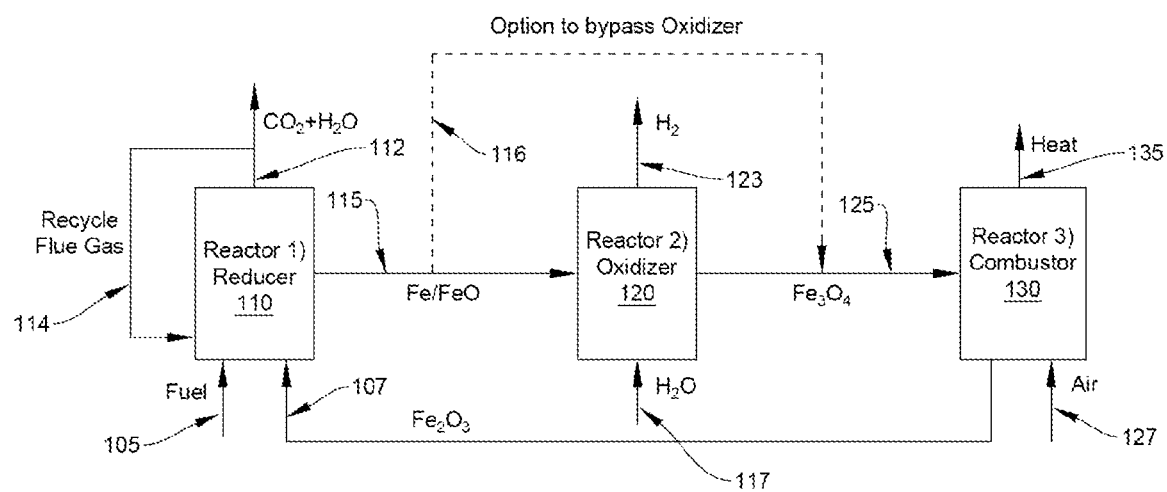
FIG. 1 is a schematic flow diagram of a chemical looping process.

As used herein, "wt %" means percentage by weight, "vol %" means percentage by volume, "mol %" means percentage by mole, "ppm" means parts per million. All "ppm" as used herein are ppm by weight unless specified otherwise. All concentrations herein are expressed on the basis of the total amount of the composition in question. All ranges expressed herein should include both end points as two specific embodiments unless specified or indicated to the contrary.

As used herein, the term "catalyst coke" or "coke" refers to carbon-containing compounds that deposit in the pores of the FCC catalyst during the fluid catalytic cracking process. Typically, the coke compounds are composed of carbon, hydrogen and trace amounts of sulfur and nitrogen. As used herein, the term "cokes" refer to a plurality of carbon-containing compounds that deposit in the pores of the FCC catalyst during the fluid catalytic cracking process.

As used herein, "feedstock" and "feed" (and grammatical derivatives thereof) are used interchangeably and both refer to a composition that is fed into a reactor. A feedstock may optionally have been pre-treated to modify its disposition.

As used herein, the term "hydrocarbon" refers to a class of compounds containing hydrogen bound to carbon, and encompasses (i) saturated hydrocarbon compounds; (ii) unsaturated hydrocarbon compounds; and (iii) mixtures of hydrocarbon compounds (saturated and/or unsaturated), including mixtures of hydrocarbon compounds having different values of n, i.e. differing carbon numbers.

As used herein, the term "metal oxide" refers to metal oxides comprising oxides, hydroxides, oxyhydroxides, and hydrated oxides of Al, Cu, Fe, Mg, Mn, Ni, and Ti. Exemplary metal oxide particles include copper oxide, nickel oxide, magnesium oxide, iron oxide, manganese oxide, titanium dioxide and mixtures thereof.

As used herein, the term "reactor" refers to any vessel(s) in which a chemical reaction occurs. Reactor includes both distinct reactors, as well as reaction zones within a single reactor apparatus and, as applicable, reactions zones across multiple reactors. For example, a single reactor may have multiple reaction zones. Where the description refers to a first and second reactor, the person of ordinary skill in the art will readily recognize such reference includes two reactors, as well as a single reactor vessel having first and second reaction zones. Likewise, a first reactor effluent and a second reactor effluent will be recognized to include the effluent from the first reaction zone and the second reaction zone of a single reactor, respectively.

As used herein, the term "synthesis gas" or "syngas" is a gas stream containing carbon monoxide and hydrogen.

In a Fluid Catalytic Cracking (FCC) process, high molecular weight hydrocarbons from crude oil are converted to lower molecular weight hydrocarbons. The fluid catalytic cracking unit usually comprises a FCC reactor and a FCC regenerator. The feedstock for the FCC process is the portion of the crude oil with a boiling point greater than 340° C. (644° F.). This portion of the crude oil is preheated to a temperature of about 315 to 430° C., fed into the FCC reactor and then brought into contact with a catalyst to break down or "crack" the high molecular weight hydrocarbons. The FCC catalyst is a microspheroidal catalyst, which behaves like a liquid when aerated by gas. Typically, FCC catalysts are in the form of fine powders with an average particle size of 60-75 μm and a size distribution from 20 to 120 μm. When this catalytic cracking occurs, carbon-containing compounds (also known as catalyst coke) deposit in the pores of the FCC catalyst. The presence of catalyst coke reduces the activity of the FCC catalyst.

After the catalytic cracking occurs, the catalyst particles are separated from the cracked vapors. The spent catalyst particles are fed into a FCC regenerator. Typically, the spent catalyst particles contain between 0.4 to 2.5 wt % catalyst coke. The coke is composed of carbon, hydrogen and trace amounts of sulfur and nitrogen. In the FCC regenerator, a stream of air reacts with the catalyst coke to regenerate the catalyst. This combustion process in the FCC regenerator produces a large amount of $CO_2$ emissions in a petroleum refinery. As a result, the Fluid Catalytic Cracking (FCC) process is called one of largest $CO_2$ emissions source in a refinery.

To reduce the $CO_2$ emissions from the FCC process, the present invention proposes a re-designed FCC process concept incorporating a chemical looping process. The Chemical Looping process utilizes as a metal oxide-based oxygen carrier to convert carbonaceous fuels to products such as $H_2$, syngas and heat, while achieving the intrinsic separation of $CO_2$ from the flue gas. Various metal oxides, for example, Cu, Ni, Mg, and Mn, are candidates for the oxygen carrier in the Chemical Looping process. Iron oxide is an example of metal oxide-based oxygen carrier.

The chemical looping process is schematically illustrated in FIG. 1. In FIG. 1, the Chemical Looping process cycles metal oxides, such as iron-based oxygen carriers thru three reactors, i.e. a Reducer 110, an Oxidizer 120, and a Combustor 130. The Reducer 110, the first reactor, features a unique design of a gas-solid counter-current moving bed configuration to achieve the reduction of $Fe_2O_3$ particles to lower its lower oxidation state such as Fe and FeO, while fully converting the carbonaceous fuels into highly concentrated $CO_2$ (>95 vol. %), which can be utilized in the Enhanced Oil Recovery (EOR) or undergo to geological, mineral and oceanic sequestrations. In a fluidized bed or co-current reactor system, thermodynamic limits constraint reducibility of $Fe_2O_3$ to only $Fe_3O_4$ [1-2], but a moving bed configuration yields a mixture of Fe and FeO [3-4]. Thus, a moving bed system provides more effective reactor design for the iron-based chemical looping process for $CO_2$ maximization configuration and is a preferred configuration. In the second reactor 120, called the Oxidizer, the reduced iron particles 115 react with steam 117 to produce high purity $H_2$ 123. Because there are no other gas species involved in this reactor, the high purity $H_2$ 123 can be obtained without additional gas separation processes. In the last reactor, the Combustor 130, iron particles 125 are fully oxidized back to $Fe_2O_3$ 107 by air 127. This oxidation reaction of iron in the Combustor is highly exothermic reaction and the heat 135 can be recovered. Depending on the demand of the products, $H_2$ 123 and heat 135 from the Chemical Looping process, the operability of the oxidizer 120 and the combustor 130 can be adjusted.

Figure 2:
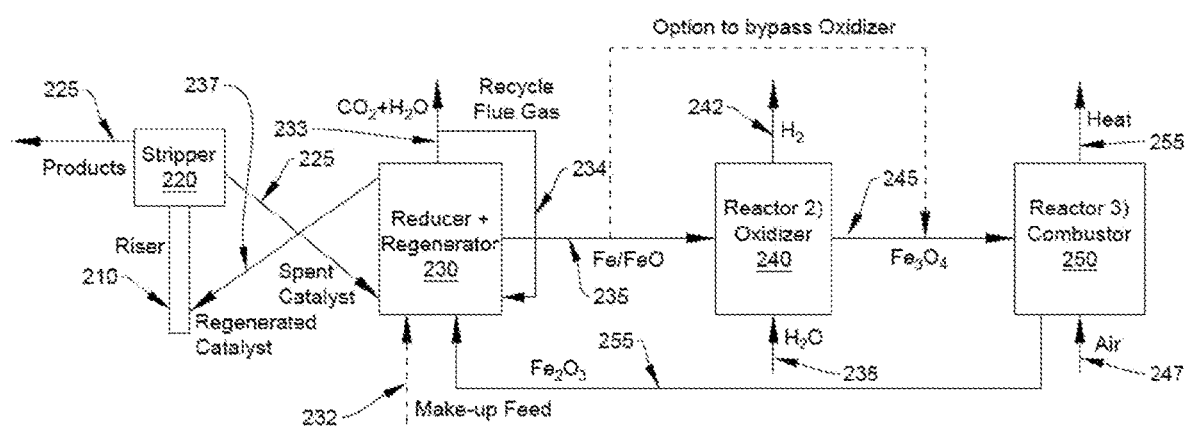
FIG. 2 is a schematic flow diagram of FCC-Chemical Looping process for $CO_2$ maximization via direct conversion of coke by metal oxides.

The following reactions summarize the chemistry of each reactor of the Chemical Looping process. The present invention describes two cases, in which the Chemical Looping process is combined with the FCC unit to mitigate the $CO_2$ emissions from the FCC process. Reactions in the three reactors are as follows:

The Reducer Reactor 110: $Fe_2O_3 + C_xH_yO_z$ (Carbonaceous Fuels) $\rightarrow$ Fe/FeO + $CO_2$ + $H_2O$ The Oxidizer Reactor 120: Fe/FeO + $H_2O \rightarrow Fe_3O_4 + H_2$ The Combustor Reactor 130: $Fe_3O_4$ + Air $\rightarrow Fe_2O_3$ + Heat Scheme 1: Direct Conversion of Catalyst Coke by Metal Oxide in Chemical Looping Process for $CO_2$ Concentration The first scenario requires a re-design of the Regenerator reactor of the FCC process wherein the Regenerator is combined with the Reducer of the Chemical Looping process for $CO_2$ maximization from the FCC process. FIG. 2 schematically describes the process flow of direct conversion of coke on the FCC catalyst with a chemical looping process. As seen in FIG. 2, the iron oxide particles 255 directly react with the coke particles on the FCC catalyst to generate a sequestration-ready $CO_2$ stream 233 in Reducer/Regenerator reactor 230, instead of the partial oxidation of coke with pure $O_2$ in a separate Regenerator required in Scheme 2. This configuration eliminates the energy-intensive air separation unit (ASU) required in Scheme 2.

Figure 3:
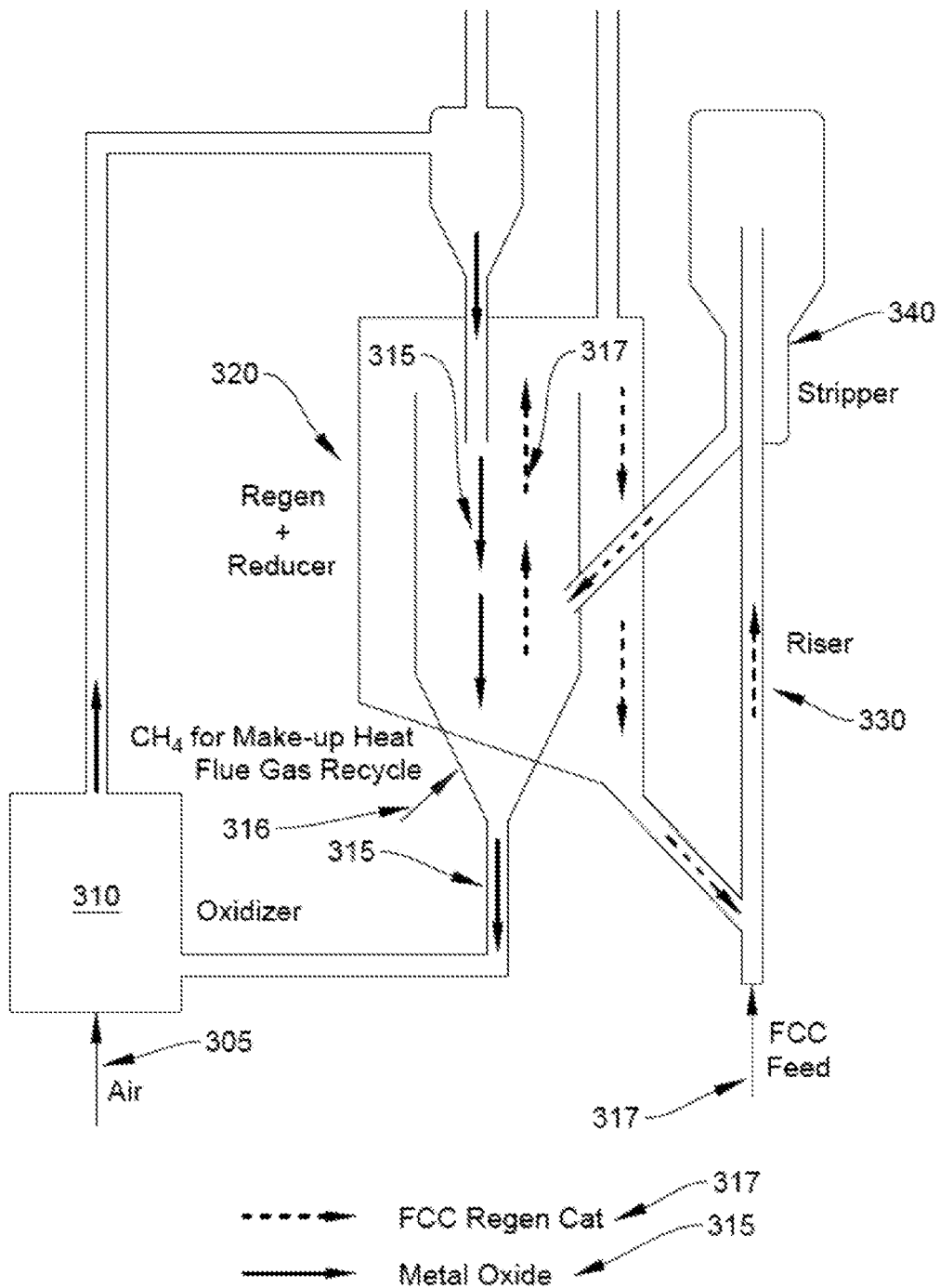
FIG. 3 is a schematic flow diagram of a reactor system for direct conversion of coke in the Chemical Looping process.

FIG. 3 schematically illustrates the reactor system of Scheme 1. In FIG. 3, the reactor 320 is designed to combine the functions of the Regenerator of the FCC unit and the Reducer of Chemical Looping unit. In one embodiment, this reactor 320 is optionally configured as a counter-current moving-fluidized bed, where large-sized iron metal oxide particles 315 are packed and slowly move downward and the spent FCC catalyst particles 315 are fluidized between the large-sized iron particles to flow upward. As the spent catalysts flow against the iron oxide particles, the coke particles on the FCC catalyst are directly converted to $CO_2$ and $H_2O$ by the iron oxide particles. The similar scheme of direct conversion of solid fuel in the Chemical Looping process has been widely studied with other solid-based fuels such as coal and biomass [1-8], but no studies have been reported with the coke particles on the FCC catalyst. After the coke conversion in the reactor 320, it is very critical to achieve the effective separation of the catalyst particles from the iron particles, because the leakage of iron particles to the other side of the FCC unit may result in catalyst fouling and affect the yield and quality of FCC unit. The large particle size difference between the FCC catalyst particles and the iron-based oxygen particles enables the easy separation of the two solid particles. The large-sized iron particles exit the moving bed system from the bottom in a packed manner, and the fine FCC catalysts intrinsically over-flow at the top of the moving bed reactor 320. Physical sieves can be also applied for the solid-solid separation.

Figure 4:
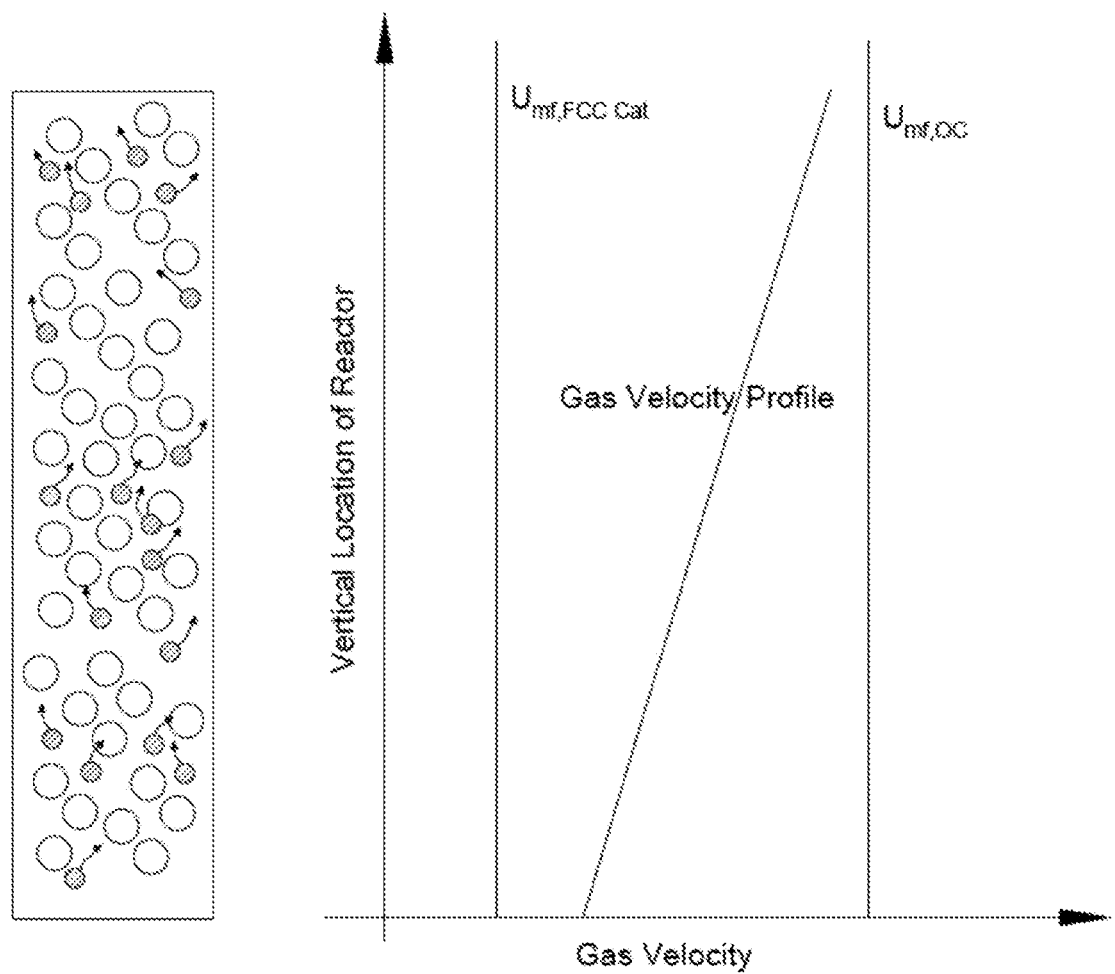
FIG. 4 is a gas velocity profile of Regenerator+Reducer Reactor.

In the operation of Scheme 1, it is also important to regulate the vertical profile of gas velocity throughout the Reducer 320. FIG. 4 schematically describes the vertical gas velocity profile in the reactor 320. In order to keep the moving bed and fluidizing configurations for the iron particles and the FCC catalyst particles, respectively, the gas velocity is maintained under the minimum fluidization velocity of the metal oxide carriers, but well-above the minimum fluidization velocity of the FCC catalyst particles throughout the reactor 320. The large particle size difference between these two particle streams provides a large operation window in terms of gas velocity management. The gas velocity can be regulated by adjusting the amount of recycled flue gas and methane 315 for the make-up heat. Moreover, the evolved $CO_2$ throughout the reactor needs to be taken into account when estimating the gas velocity, as the catalyst coke is converted to $CO_2$ by the metal oxide oxygen carrier. Depending on the demands from the refinery, the reduced iron particles from the Reducer/Regenerator Reactor 320 have the option to generate heat or $H_2$ in their respective reactors. In addition, a make-up feed 316 of hydrocarbons, for example, $CH_4$ can compensate the necessary heat requirement for the process operation within the $CO_2$ maximization configuration.

In one embodiment, a method for reducing $CO_2$ emissions from a fluid catalytic cracking process is described comprising the following steps:

a) providing a chemical looping system comprising a reducer/regenerator reactor, an oxidizer reactor and a combustor reactor;
  i) feeding catalyst coke particles and metal oxide particles into the reducer/regenerator reactor of the chemical looping system to produce a plurality of streams comprising a regenerated catalyst stream, a $CO_2/H_2O$ stream and a reduced metal oxide particle stream;
  ii) feeding the stream of reduced metal oxide particles and a stream of water vapor into the oxidizer reactor of the chemical looping system to produce a plurality of streams comprising a hydrogen stream and a stream of oxidized metal oxide particles; and
  iii) feeding the stream of oxidized metal oxide particles and a stream of air into the combustor reactor of the chemical looping system to produce heat and a stream of metal oxide particles; and b) sequestering the carbon dioxide of the $CO_2/H_2O$ stream of step (a)(i) to reduce the $CO_2$ emissions from the reducer/regenerator reactor.

In another embodiment, a portion of the $CO_2/H_2O$ stream of step (a)(i) is fed back into the reducer/regenerator reactor of step (a).

In another embodiment, the reducer/regenerator reactor of step (a)(i) is a moving bed reactor. In a further embodiment, the moving bed reactor is a counter-current moving fluidized bed reactor. In another embodiment, the moving bed reactor is not a counter-current moving fluidized bed reactor. In a further embodiment, the moving bed reactor is a co-current moving fluidized bed reactor.

In another embodiment, the oxidizer reactor of step (b)(i) is a moving bed reactor. In a further embodiment, the moving bed reactor is a counter-current moving fluidized bed reactor. In another embodiment, the oxidizer of step (b)(i) is not a counter-current moving fluidized bed reactor.

In a further embodiment, the oxidizer of step (b)(i) is a co-current moving fluidized bed reactor.

In a further embodiment, the reduced metal oxide particle stream of step (a)(i) leaves from the bottom of the moving fluidized bed reactor. In another embodiment, the regenerated catalyst stream leaves from the top of the moving fluidized bed reactor.

In another embodiment, the reduced metal oxide particle stream of step (a)(i) leaves from the bottom of the moving fluidized bed reactor. In a further embodiment, the regenerated catalyst stream leaves from the bottom of the moving fluidized bed reactor.

In a further embodiment, the reduced metal oxide particle stream of step (a)(i) leaves from the top of the moving fluidized bed reactor. In another embodiment, the regenerated catalyst stream leaves from the top of the moving fluidized bed reactor.

In another embodiment, the regenerated catalyst stream and the reduced metal oxide particle stream of step (a)(i) are physically separated. In a further embodiment, the regenerated catalyst stream and the reduced metal oxide particle stream of step (a)(i) are physically separated by a physical sieve.

In another embodiment, the feed of step (a)(i) comprises a make-up feed. In a further embodiment, the make-up feed comprises methane.

In another embodiment, the metal oxide particles are selected from the group consisting of copper oxide, nickel oxide, magnesium oxide, iron oxide, manganese oxide and mixtures thereof. In a further embodiment, the metal oxide particles comprise iron oxide. In a further embodiment, the iron oxide is $Fe_2O_3$.

In another embodiment, the reduced metal oxide particles comprise iron and iron oxide particles. In a further embodiment, the iron oxide is FeO.

In another embodiment, the oxidized metal oxide particles comprise $Fe_3O_4$.

In another embodiment, the $CO_2/H_2O$ stream comprises greater that 95 vol % carbon dioxide.

In another embodiment, the catalyst coke particles are fed into a single stage reactor.

In one embodiment, a chemical looping fluid catalytic cracking (FCC) system comprising a reducer/regenerator reactor, an oxidizer reactor and a combustor reactor is described where the FCC process comprises:
  a) providing a chemical looping system comprising a reducer/regenerator reactor, an oxidizer reactor and a combustor reactor;
   i) feeding catalyst coke particles and metal oxide particles into the reducer/regenerator reactor of the chemical looping system to produce a plurality of streams comprising a regenerated catalyst stream, a $CO_2/H_2O$ stream and a reduced metal oxide particle stream;
   ii) feeding the stream of reduced metal oxide particles and a stream of water vapor into the oxidizer reactor of the chemical looping system to produce a plurality of streams comprising a hydrogen stream and a stream of oxidized metal oxide particles; and
   iii) feeding the stream of oxidized metal oxide particles and a stream of air into the combustor reactor of the chemical looping system to produce heat and a stream of metal oxide particles; and
  b) sequestering the carbon dioxide of the $CO_2/H_2O$ stream of step (a)(i) to reduce the $CO_2$ emissions from the reducer/regenerator reactor.

In a further embodiment, the reducer/regenerator reactor of step (a)(i) is a counter-current moving fluidized bed reactor.

In another embodiment, the reduced metal oxide particle stream of step (a)(i) leaves from the bottom of the moving fluidized bed reactor.

In another embodiment, the regenerated catalyst stream of step (a)(i) leaves from the top of the moving fluidized bed reactor.

In another embodiment, the metal oxide particles of step (a)(i) are selected from the group consisting of copper oxide, nickel oxide, magnesium oxide, iron oxide, manganese oxide and mixtures thereof. In a further embodiment, the metal oxide particles comprise iron oxide. In a further embodiment, the iron oxide is $Fe_2O_3$.

In another embodiment, the catalyst coke particles of step (a)(i) are fed into a single stage reactor.

Figure 5:
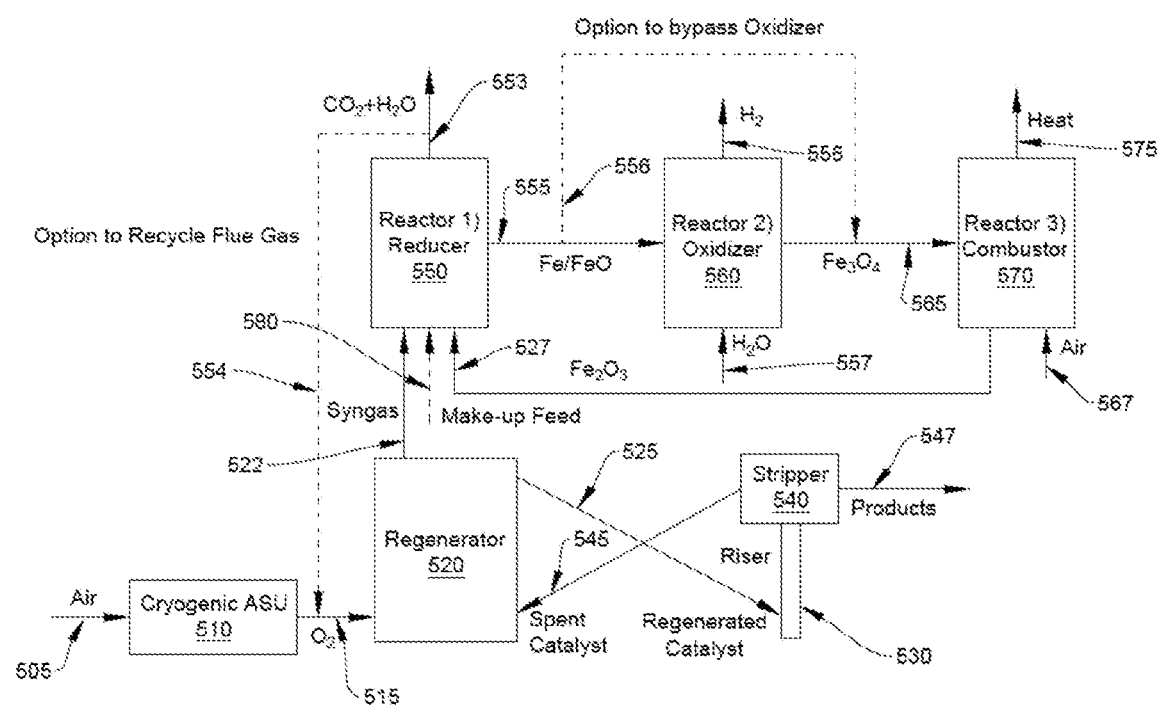
FIG. 5 is a schematic flow diagram of FCC-Chemical Looping process for $CO_2$ maximization via partial oxidation of FCC Regenerator.

Scheme 2: Partial Oxidation of Catalyst Coke in a Regenerator Followed by Chemical Looping Process for $CO_2$ Concentration and $H_2$ Generation The second scenario requires the addition of the chemical looping system to the output feed of the Regenerator reactor of the FCC process. In this scenario, the catalyst coke particles in the pores of the FCC catalyst are partially oxidized in the Regenerator reactor and then subjected to the chemical looping process. FIG. 5 describes a schematic flow diagram of Scheme 2 FCC-Chemical Looping process for $CO_2$ maximization via partial oxidation of the FCC Regenerator. As exemplified in FIG. 5, the Regenerator 520 of the FCC process is operated under the partial oxidation mode with pure $O_2$ 515. A cryogenic Air Separation Unit (ASU) 510 is used as a source of pure oxygen. The cokes on the FCC catalyst are partially oxidized and are gasified to synthesis gas (CO and $H_2$) by pure oxygen 515. The synthesis or flue gas 522, containing high concentrations of CO and $H_2$, is then sent to the Chemical Looping unit adjacent to the FCC unit.

The first reactor of Chemical Looping process of FIG. 5, the Reducer 550, converts the syngas from FCC unit to generate high purity of $CO_2$ 553 at >95 vol. %, which is sequestration-ready. The synthesis gas acts as a reducing agent in the Reducer 550. In one example, the Reducer reactor 550 is a moving bed reactor. In another example, the Reducer reactor 550 is configured as counter-current moving bed reactor for the maximum iron oxide reduction and CO and $H_2$ oxidation to $CO_2$ and $H_2O$.

A portion of flue gas 554 from this reactor containing mainly $CO_2$ and $H_2O$ can be recycled to the Regenerator 520 of the FCC process to regulate the temperature of partial oxidation reaction of coke. It is important to control the operation temperature of Regenerator 520 of the FCC unit, because of the low thermal resistance of the FCC catalyst. Generally, the temperature range of Regenerator 520 is 1300~1400° F.

From the first reactor 550 of the Chemical Looping process, the reduced iron particles 555 are sent to the second reactor 560 to produce $H_2$ 558, which can be valuably used in the refinery. In one example, the Oxidizer reactor 560 is a moving bed reactor. As mentioned before, this reactor 560 is generally capable of generating high purity $H_2$ without additional separation processes. After the oxidizer 560, the iron particles are oxidized to $Fe_3O_4$ 565, then sent to the Combustor 570 for full oxidation to $Fe_2O_3$ 527 by air 567. Because this oxidation of iron is a highly exothermic reaction, the heat 575 can be recovered and used to compensate for the heat shortage in the FCC unit and Chemical Looping process.

In order to maximize the heat 575 and $H_2$ 558 generation rate from the Chemical Looping unit, the make-up feed 526 of hydrocarbons or reductants can be made to the Reducer 550. One example of a make-up feed is $CH_4$, which has great potential for reducing iron particles. Additional feed of $CH_4$ results in higher reduction of iron oxide particles in the Reducer 550 leading to higher generation rates of $H_2$ from the Oxidizer 560 and heat from the Combustor 570.

In one embodiment, a method for reducing $CO_2$ emissions from a fluid catalytic cracking process is described comprising the following steps:
 a) partially oxidizing catalyst coke particles in a fluid catalytic cracking regenerator reactor to produce synthesis gas;
 b) providing a chemical looping system comprising a reducer reactor, an oxidizer reactor and a combustor reactor;
  i. feeding the synthesis gas and metal oxide particles into the reducer reactor of the chemical looping system to produce a plurality of streams comprising a $CO_2/H_2O$ stream and a reduced metal oxide particle stream;
  ii. feeding the stream of reduced metal oxide particles and a stream of water vapor into the oxidizer reactor of the chemical looping system to produce a plurality of streams comprising a hydrogen stream and an oxidized metal oxide particle stream; and
  iii. feeding the stream of oxidized metal oxide particles and a stream of air into the combustor reactor of the chemical looping system to produce heat and a stream of metal oxide particles; and
 c) sequestering the carbon dioxide of the $CO_2/H_2O$ stream of step (b)(i) to reduce the $CO_2$ emissions from the reducer reactor.

In another embodiment, the reducer reactor of step (b)(i) is a moving bed reactor. In a further embodiment, the moving bed reactor is a counter-current moving reactor. In another embodiment, the reducer reactor of step (b)(i) is not a counter-current moving bed reactor. In a further embodiment, the reducer reactor of step (b)(i) is a co-current moving bed reactor.

In another embodiment, the oxidizer reactor of step (b)(ii) is a moving bed reactor. In a further embodiment, the moving bed reactor is a counter-current moving fluidized bed reactor. In another embodiment, the oxidizer reactor of step (b)(ii) is not a counter-current moving reactor. In a further embodiment, the oxidizer reactor of step (b)(ii) is a co-current moving bed reactor.

In another embodiment, a portion of the $CO_2/H_2O$ stream of step (b)(i) is fed back into the fluid catalytic cracking regenerator of step (a).

In another embodiment, catalyst coke embedded in pores of the FCC catalyst of step (a) is oxidized with a stream of oxygen.

In a further embodiment, a cryogenic air separation unit is a source of oxygen for the oxidation of the catalyst coke.

In another embodiment, the temperature of the fluid catalytic cracking regenerator reactor is about 1300 to about 1400° F.

In another embodiment, the synthesis gas fed in the reducer reactor is a gas stream containing carbon dioxide and hydrogen.

In another embodiment, the feed of the reducer reactor comprises a make-up feed. In a further embodiment, the make-up feed is methane.

In another embodiment, the metal oxide particles are selected from the group consisting of copper oxide, nickel oxide, magnesium oxide, iron oxide, manganese oxide and mixtures thereof. In a further embodiment, the metal oxide particles comprise iron oxide. In a further embodiment, the iron oxide is $Fe_2O_3$.

In another embodiment, the reduced metal oxide particles comprise iron and iron oxide particles. In a further embodiment, the iron oxide is FeO.

In another embodiment, the oxidized metal oxide particles comprise $Fe_3O_4$.

In another embodiment, the $CO_2/H_2O$ stream comprises greater that 95 vol % carbon dioxide.

In another embodiment, the catalyst coke particles are fed into a single stage reactor.

In one embodiment, a chemical looping fluid catalytic cracking (FCC) system comprising a fluid catalytic cracking regenerator reactor, a reducer reactor, an oxidation reactor, a combustor reactor and optionally a cryogenic air separation reactor is described where the FCC process comprises:
 a) partially oxidizing catalyst coke in a fluid catalytic cracking regenerator reactor to produce synthesis gas;
 b) providing a chemical looping system comprising a reducer reactor, an oxidizer reactor and a combustor reactor;
  i. feeding the synthesis gas and metal oxide particles into the reducer reactor of the chemical looping system to produce a plurality of streams comprising a $CO_2/H_2O$ stream and a reduced metal oxide particle stream;
  ii. feeding the stream of reduced metal oxide particles and a stream of water vapor into the oxidizer reactor of the chemical looping system to produce a plurality of streams comprising a hydrogen stream and an oxidized metal oxide particle stream; and
  iii. feeding the stream of oxidized metal oxide particles and a stream of air into the combustor reactor of the chemical looping system to produce heat and a stream of metal oxide particles; and
 c) sequestering the carbon dioxide of the $CO_2/H_2O$ stream of step (b)(i) to reduce the $CO_2$ emissions from the reducer reactor.

In a further embodiment, the reducer reactor is a counter-current moving reactor. In another embodiment, the reducer reactor is not a counter-current moving reactor.

In another embodiment, a cryogenic air separation reactor is a source of oxygen for step (a).

In another embodiment, the metal oxide particles of step (b)(i) are selected from the group consisting of copper oxide, nickel oxide, magnesium oxide, iron oxide, manganese oxide and mixtures thereof. In a further embodiment, the metal oxide particles comprise iron oxide. In a further embodiment, the iron oxide is $Fe_2O_3$.

In another embodiment, the catalyst coke of step (a) is fed into a single stage reactor.

Additional Embodiments

This disclosure may further include one or more of the following non-limiting embodiments:

E1. A chemical looping fluid catalytic cracking (FCC) system comprising a fluid catalytic cracking regenerator reactor, a reducer reactor, an oxidation reactor, a combustor reactor and optionally a cryogenic air separation reactor where the FCC process comprises:
 a) partially oxidizing catalyst coke in a fluid catalytic cracking regenerator reactor to produce synthesis gas;

b) providing a chemical looping system comprising a reducer reactor, an oxidizer reactor and a combustor reactor;
   i) feeding the synthesis gas and metal oxide particles into the reducer reactor of the chemical looping system to produce a plurality of streams comprising a $CO_2/H_2O$ stream and a reduced metal oxide particle stream;
   ii) feeding the stream of reduced metal oxide particles and a stream of water vapor into the oxidizer reactor of the chemical looping system to produce a plurality of streams comprising a hydrogen stream and an oxidized metal oxide particle stream; and
   iii) feeding the stream of oxidized metal oxide particles and a stream of air into the combustor reactor of the chemical looping system to produce heat and a stream of metal oxide particles; and
c) sequestering the carbon dioxide of the $CO_2/H_2O$ stream of step (b)(i) to reduce the $CO_2$ emissions from the reducer reactor.

E2. The chemical looping fluid catalytic cracking system of E1 wherein the reducer reactor is a counter-current moving bed reactor.

E3. The chemical looping fluid catalytic cracking system of E1 wherein the reducer reactor is a co-current moving bed reactor.

E4. The chemical looping fluid catalytic cracking system of E1 wherein a cryogenic air separation reactor is a source of oxygen for step (a).

E5. The chemical looping fluid catalytic cracking system of E1 wherein the metal oxide particles are selected from the group consisting of copper oxide, nickel oxide, magnesium oxide, iron oxide, manganese oxide and mixtures thereof.

E6. The chemical looping fluid catalytic cracking system of E5 wherein the metal oxide particles comprise iron oxide E7. The chemical looping fluid catalytic cracking system of E6 wherein the iron oxide is $Fe_2O_3$.

E8. The chemical looping fluid catalytic cracking system of E1 wherein the catalyst coke particles are fed into a single stage reactor.

E9. A chemical looping fluid catalytic cracking (FCC) system comprising a reducer/regenerator reactor, an oxidizer reactor and a combustor reactor is described where the FCC process comprises:
   a) providing a chemical looping system comprising a reducer/regenerator reactor, an oxidizer reactor and a combustor reactor;
      i) feeding catalyst coke particles and metal oxide particles into the reducer/regenerator reactor of the chemical looping system to produce a plurality of streams comprising a regenerated catalyst stream, a $CO_2/H_2O$ stream and a reduced metal oxide particle stream;
      ii) feeding the stream of reduced metal oxide particles and a stream of water vapor into the oxidizer reactor of the chemical looping system to produce a plurality of streams comprising a hydrogen stream and a stream of oxidized metal oxide particles; and
      iii) feeding the stream of oxidized metal oxide particles and a stream of air into the combustor reactor of the chemical looping system to produce heat and a stream of metal oxide particles; and
   b) sequestering the carbon dioxide of the $CO_2/H_2O$ stream of step (a)(i) to reduce the $CO_2$ emissions from the reducer/regenerator reactor.

E10. The chemical looping fluid catalytic cracking system of E9 wherein the reducer/regenerator reactor of step (a)(i) is a counter-current moving fluidized bed reactor.

E11. The chemical looping fluid catalytic cracking system of E9 wherein the reducer/regenerator reactor of step (a)(i) is a co-current moving fluidized bed reactor.

E12. The chemical looping fluid catalytic cracking system of E10 wherein the reduced metal oxide particle stream leaves from the bottom of the moving fluidized bed reactor.

E13. The chemical looping fluid catalytic cracking system of E10 wherein the regenerated catalyst stream leaves from the top of the moving fluidized bed reactor.

E14. The chemical looping fluid catalytic cracking system of E9 wherein the metal oxide particles are selected from the group consisting of copper oxide, nickel oxide, magnesium oxide, iron oxide, manganese oxide and mixtures thereof.

E15. The chemical looping fluid catalytic cracking system of E14 wherein the metal oxide particles comprise iron oxide.

E16. The chemical looping fluid catalytic cracking system of E15 wherein the iron oxide is $Fe_2O_3$.

E17. The chemical looping fluid catalytic cracking system of E9 wherein the catalyst coke particles of step (a)(i) are fed into a single stage reactor.

In the specification and in the claims, the terms "including" and "comprising" are open-ended terms and should be interpreted to mean "including, but not limited to". These terms encompass the more restrictive terms "consisting essentially of" and "consisting of." It must be noted that as used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

All documents described herein are incorporated by reference herein, including any priority documents and/or testing procedures to the extent they are not inconsistent with this text. As is apparent from the foregoing general description and the specific embodiments, while forms of the present disclosure have been illustrated and described, various modifications can be made without departing from the spirit and scope of the present disclosure. Accordingly, it is not intended that the present disclosure be limited thereby.

The various descriptive elements and numerical ranges disclosed herein for the reactants used to make petroleum distillate products, and their use can be combined with other descriptive elements and numerical ranges to describe the invention(s); further, for a given element, any upper numerical limit can be combined with any lower numerical limit described herein. The features of the invention are described in the following non-limiting examples.

REFERENCES

[1] Tong, A., Bayham, S., Kathe, M., Zeng, L., Luo, S., Fan, L. Iron-based syngas chemical looping process and coal-direct chemical looping process development at Ohio State University. Applied Energy. Volume 113. 2014. 1836-1845.

[2] Li, F., Zeng, L., Fan, L. Biomass direct chemical looping process: Process simulation. Fuel. Volume 89 (12). 2010. 3773-3784.

[3] Kim, H., Wang, D., Zeng, L., Bayham, S., Tong, A., Chung, E., et al. Coal direct chemical looping combustion process: design and operation of a 25-kWth sub-pilot unit. Fuel. Volume 108. 2013. 370-384.

[4] Wang, B., Zhao, H., Zheng, Y., Liu, Z., Yan, R., Zheng, C. Chemical looping combustion of a Chinese anthracite with Fe2O3-based and CuO-based oxygen carriers. Fuel Processing Technology. Volume 96. 2012. 104-115.

[5] Leion, H., Mattisson, T., Lyngfelt, A. Solid fuels in chemical-looping combustion. International Journal of Greenhouse Gas Control. 2 (2). 2008. 180-193.

[6] Dennis, J., Scott, S., In situ gasification of coal and $CO_2$ separation using chemical looping with a Cu-based oxygen carrier. Fuel. 2010. 89 (7). 1623-1640.

[7] Cao, Y., Pan, W. Investigation of chemical looping combustion by solid fuels. 1. Process analysis. Energy & Fuels. 20 (5). 2006. 1836-1844.

[8] Siriwardane, R., Tian, H, Miller, D., Richards, T., Simonyi, T., Poston, J. Evaluation of reaction mechanism of coal-metal oxide interactions in chemical-looping combustion. Combustion and Flame. 157 (11). 2010. 2198-2208.

The invention claimed is:

1. A method for reducing $CO_2$ emissions from a fluid catalytic cracking process by
    a) providing a chemical looping system comprising a regenerator and reducer reactor, an oxidizer reactor and a combustor reactor;
        i) feeding catalyst coke particles and metal oxide particles into the regenerator and reducer reactor of the chemical looping system to produce a plurality of streams comprising a regenerated catalyst stream, a $CO_2$ and $H_2O$ stream and a reduced metal oxide particle stream;
        ii) feeding the stream of reduced metal oxide particles and a stream of water vapor into the oxidizer reactor of the chemical looping system to produce a plurality of streams comprising a hydrogen stream and a stream of oxidized metal oxide particles; and
        iii) feeding the stream of oxidized metal oxide particles and a stream of air into the combustor reactor of the chemical looping system to produce heat and a stream of metal oxide particles; and
    b) sequestering the carbon dioxide of the $CO_2$ and $H_2O$ stream of step (a)(i) to reduce the $CO_2$ emissions from the regenerator and reducer reactor.

2. The method of claim 1, wherein a portion of the $CO_2$ and $H_2O$ stream of step (a)(i) is fed back into the regenerator and reducer reactor of step (a).

3. The method of claim 1, wherein the regenerator and reducer reactor is a counter-current moving fluidized bed reactor.

4. The method of claim 3, wherein the reduced metal oxide particle stream leaves from the bottom of the counter-current moving fluidized bed reactor.

5. The method of claim 3, wherein the regenerated catalyst stream leaves from the top of the counter-current moving fluidized bed reactor.

6. The method of claim 1, wherein the regenerated catalyst stream and the reduced metal oxide particle stream of step (a)(i) are physically separated.

7. The method of claim 6, wherein the regenerated catalyst stream and the reduced metal oxide particle stream of step (a)(i) are physically separated by a physical sieve.

8. The method of claim 1, wherein the feed of step (a)(i) comprises a make-up feed.

9. The method of claim 8, wherein the make-up feed comprises methane.

10. The method of claim 1, wherein the metal oxide particles are selected from the group consisting of copper oxide, nickel oxide, magnesium oxide, iron oxide, manganese oxide and mixtures thereof.

11. The method of claim 10, wherein the metal oxide particles comprise iron oxide.

12. The method of claim 11, wherein the iron oxide is $Fe_2O_3$.

13. The method of claim 1, wherein the reduced metal oxide particles comprise iron and iron oxide particles.

14. The method of claim 13, wherein the iron oxide is FeO.

15. The method of claim 1, wherein the oxidized metal oxide particles comprise $Fe_3O_4$.

16. The method of claim 1, wherein the $CO_2$ and $H_2O$ stream comprises greater that 95 vol % carbon dioxide.

17. The method of claim 1, wherein the catalyst coke particles are fed into a single stage reactor.

* * * * *